United States Patent
Potnis et al.

(10) Patent No.: US 11,010,351 B1
(45) Date of Patent: May 18, 2021

(54) FILE SYSTEM REPLICATION BETWEEN SOFTWARE DEFINED NETWORK ATTACHED STORAGE PROCESSES USING FILE SYSTEM SNAPSHOTS

(71) Applicant: EMC IP HOLDING COMPANY LLC, Hopkinton, MA (US)

(72) Inventors: Ajay Potnis, Pune (IN); Amit Dharmadhikari, Pune (IN); Kiran Halwai, Pune (IN); Adnan Sahin, Needham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 461 days.

(21) Appl. No.: 16/176,164

(22) Filed: Oct. 31, 2018

(51) Int. Cl.
*G06F 16/00* (2019.01)
*G06F 16/182* (2019.01)
*G06F 9/455* (2018.01)
*G06F 16/27* (2019.01)
*G06F 16/11* (2019.01)
*G06F 16/188* (2019.01)

(52) U.S. Cl.
CPC ...... *G06F 16/1844* (2019.01); *G06F 9/45558* (2013.01); *G06F 16/128* (2019.01); *G06F 16/188* (2019.01); *G06F 16/1824* (2019.01); *G06F 16/27* (2019.01); *G06F 2009/45583* (2013.01)

(58) Field of Classification Search
CPC .......... G06F 16/1844; G06F 16/1824; G06F 16/128; G06F 16/188; G06F 16/27; G06F 9/45558; G06F 2009/45583
See application file for complete search history.

(56) References Cited

U.S. PATENT DOCUMENTS

| | | | |
|---|---|---|---|
| 7,516,286 B1* | 4/2009 | Dalal | G06F 3/0608 |
| | | | 707/999.202 |
| 9,268,797 B2* | 2/2016 | Whitehead | G06F 3/0608 |
| 9,602,341 B1* | 3/2017 | Degwekar | G06F 9/5077 |
| 10,365,978 B1* | 7/2019 | Whitney | G06F 11/1464 |
| 10,795,786 B1* | 10/2020 | Potnis | G06F 3/067 |
| 10,795,787 B1* | 10/2020 | Potnis | G06F 16/188 |
| 10,831,618 B1* | 11/2020 | Potnis | H04L 67/1097 |
| 10,911,540 B1* | 2/2021 | Gunasekaran | G06F 9/455 |
| 10,929,257 B1* | 2/2021 | Potnis | G06F 11/2094 |
| 10,936,010 B2* | 3/2021 | Meiri | G06F 1/12 |
| 10,936,437 B1* | 3/2021 | Santos | G06F 11/3034 |
| 10,936,439 B2* | 3/2021 | Auvenshine | G06F 11/3447 |

(Continued)

*Primary Examiner* — Noosha Arjomandi
(74) *Attorney, Agent, or Firm* — Anderson Gorecki LLP

(57) ABSTRACT

A first Software Defined Network Attached Storage (SD-NAS) process on a first storage system forwards snapshots of a file system provided by the first storage system to a second SDNAS process on a second storage system. The snapshots are forwarded by the first SDNAS process on an Internet Protocol (IP) network, to enable the first and second SDNAS processes to maintain redundant access to data of the file system without requiring the first storage system and second storage system to be interoperable. The initial snapshot includes a full version of the file system and subsequent snapshots include changed portions of the file system. Where the snapshot identifies changed portions at the extent level of granularity, the first SDNAS process subdivides the extents into sub-blocks, and only transmits changed sub-blocks of the extents on the IP network.

17 Claims, 4 Drawing Sheets

(56) References Cited

U.S. PATENT DOCUMENTS

| | | | |
|---|---|---|---|
| 10,942,821 B1* | 3/2021 | Potnis | G06F 3/0673 |
| 10,949,124 B2* | 3/2021 | Liguori | G06F 3/0665 |
| 2005/0193245 A1* | 9/2005 | Hayden | G06F 11/2069 |
| | | | 714/13 |
| 2006/0101204 A1* | 5/2006 | Bao | G06F 3/0605 |
| | | | 711/114 |
| 2007/0240154 A1* | 10/2007 | Gerzymisch | G06Q 30/0621 |
| | | | 717/174 |
| 2009/0300079 A1* | 12/2009 | Shitomi | G06F 3/0649 |
| 2011/0138131 A1* | 6/2011 | Regni | G06F 9/5077 |
| | | | 711/133 |
| 2015/0244795 A1* | 8/2015 | Cantwell | G06F 16/27 |
| | | | 709/202 |
| 2017/0269859 A1* | 9/2017 | Xu | G06F 3/0617 |
| 2019/0332499 A1* | 10/2019 | Huang | G06F 3/0659 |

\* cited by examiner

FILE SYSTEM REPLICATION BETWEEN SOFTWARE DEFINED NETWORK ATTACHED STORAGE PROCESSES USING FILE SYSTEM SNAPSHOTS

BACKGROUND

This disclosure relates to computing systems and related devices and methods, and, more particularly, to a method and system for providing file system replication between Software Defined Network Attached Storage (SDNAS) processes using snapshots of the file system provided by an underlying storage system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A first Software Defined Network Attached Storage (SDNAS) process on a first storage system forwards snapshots of a file system provided by the first storage system to a second SDNAS process on a second storage system. The snapshots are forwarded by the first SDNAS process on an Internet Protocol (IP) network, to enable the first and second SDNAS processes to maintain redundant access to data of the file system without requiring the first storage system and second storage system to be interoperable. The initial snapshot includes a full version of the file system and subsequent snapshots include changed portions of the file system. Where the snapshot identifies changed portions at the extent level of granularity, the first SDNAS process subdivides the extents into sub-blocks, and only transmits changed sub-blocks of the extents on the IP network.

DETAILED DESCRIPTION

Figure 1:
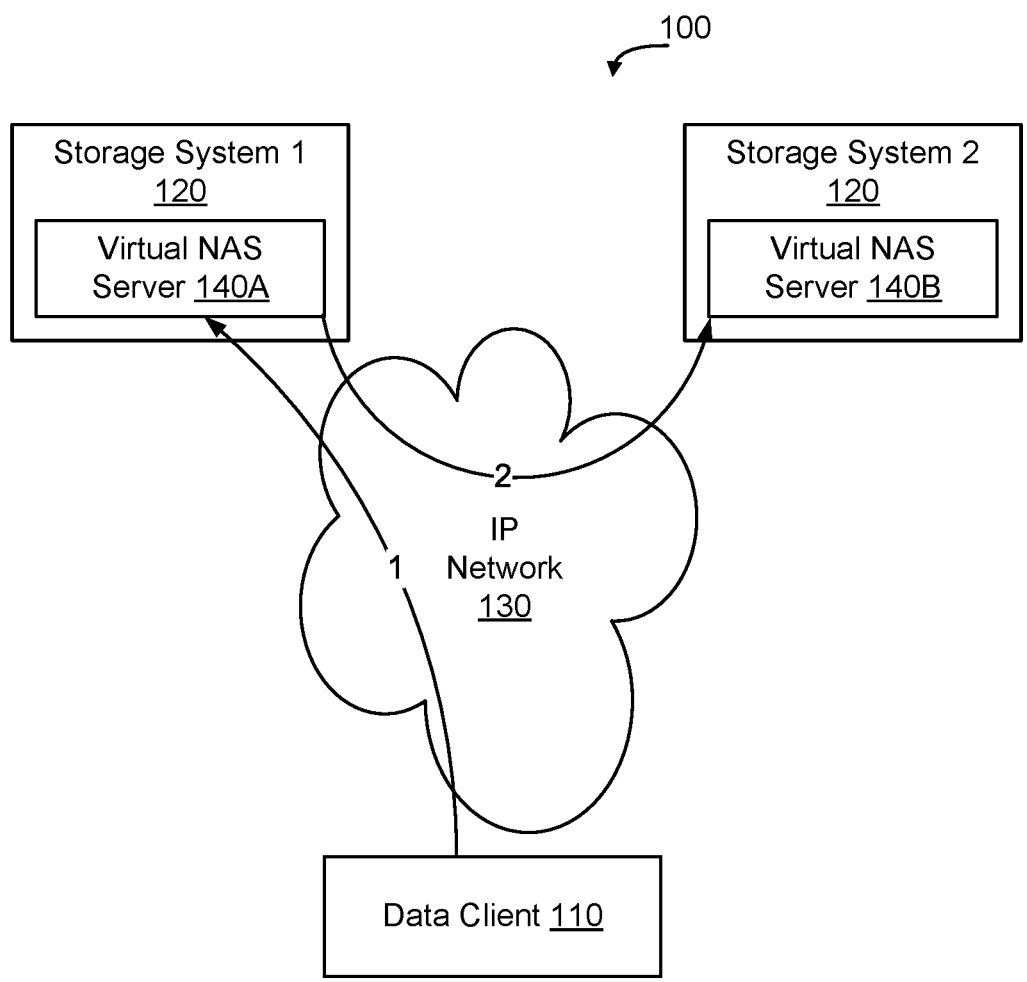
FIG. 1 is a functional block diagram of an example storage environment configured to provide file system replication between Software Defined Network Attached Storage (SDNAS) processes using snapshots of the file system provided by an underlying storage system according to some embodiments of the present disclosure.

FIG. 1 is a functional block diagram of an example storage environment configured to provide file system replication between Software Defined Network Attached Storage (SDNAS) processes using snapshots of the file system provided by an underlying storage system according to some embodiments of the present disclosure.

As shown in FIG. 1, a data client 110 may access storage resources provided by one or more storage systems 120 over a communication network 130. In some embodiments, the communication network 130 is an Internet Protocol (IP) communication network enabling transmission of IP data packets through the communication network 130. Data from the data client 110 is stored in the storage resources of the storage systems 120. Storage resources that are accessed by a data client 110 over a communication network are referred to herein as Network Attached Storage (NAS). In some embodiments, the storage resources of a storage system 120 are abstracted to the data client 110 by software applications referred to herein as "Software Defined Network Attached Storage (SDNAS) applications." A given SDNAS application may, in some embodiments, be implemented as a Virtual Network Attached Storage (VNAS) server 140.

To provide enhanced reliability, data from data client 110 may be stored in more than one storage system 120 on the communication network 130. In some embodiments, the data client 110 interacts with a file system maintained by a primary VNAS server 140A on a primary storage system 120A. If a failure occurs on the primary storage system 120A, on communication network 130, or elsewhere, which renders the data client 110 unable to access the file system on the primary storage system 120A, the data client 110 is able to access the file system on the backup VNAS server 140B on the backup storage system 120B.

Two or more virtual NAS servers 140 that are logically associated to provide redundant access to a file system will be referred to herein as a "cluster". In some embodiments, one of the virtual NAS servers 140 will assume the role of a primary virtual NAS server in the cluster, and other virtual NAS servers 140 will assume the role of backups in the cluster. A virtual NAS server will also be referred to herein as a "node" in the cluster. Each node has a Virtual Data Mover (VDM) that is responsible for activities associated with storage of data from the data client 110.

If the storage systems 120A and 120B are compatible and properly configured, it is possible for the underlying storage systems 120 to coordinate replication of data from the primary storage system 120A to the backup storage system 120B directly. However, in some instances it may be preferable for the virtual NAS servers 140 to coordinate the replication of data associated with the data client 110 file systems without relying on the underlying storage systems to implement this functionality. For example, since the VNAS servers 140 are defined by software, they can run on any underlying hardware platform. Enabling the VNAS servers 140 to handle replication functionality within the cluster enables the VNAS servers to execute on any storage system without regard to whether the primary storage system 120A and backup storage system 120 B are compatible, and without requiring the two storage systems to be configured at the storage system level to implement mirroring, etc.

Figure 2:
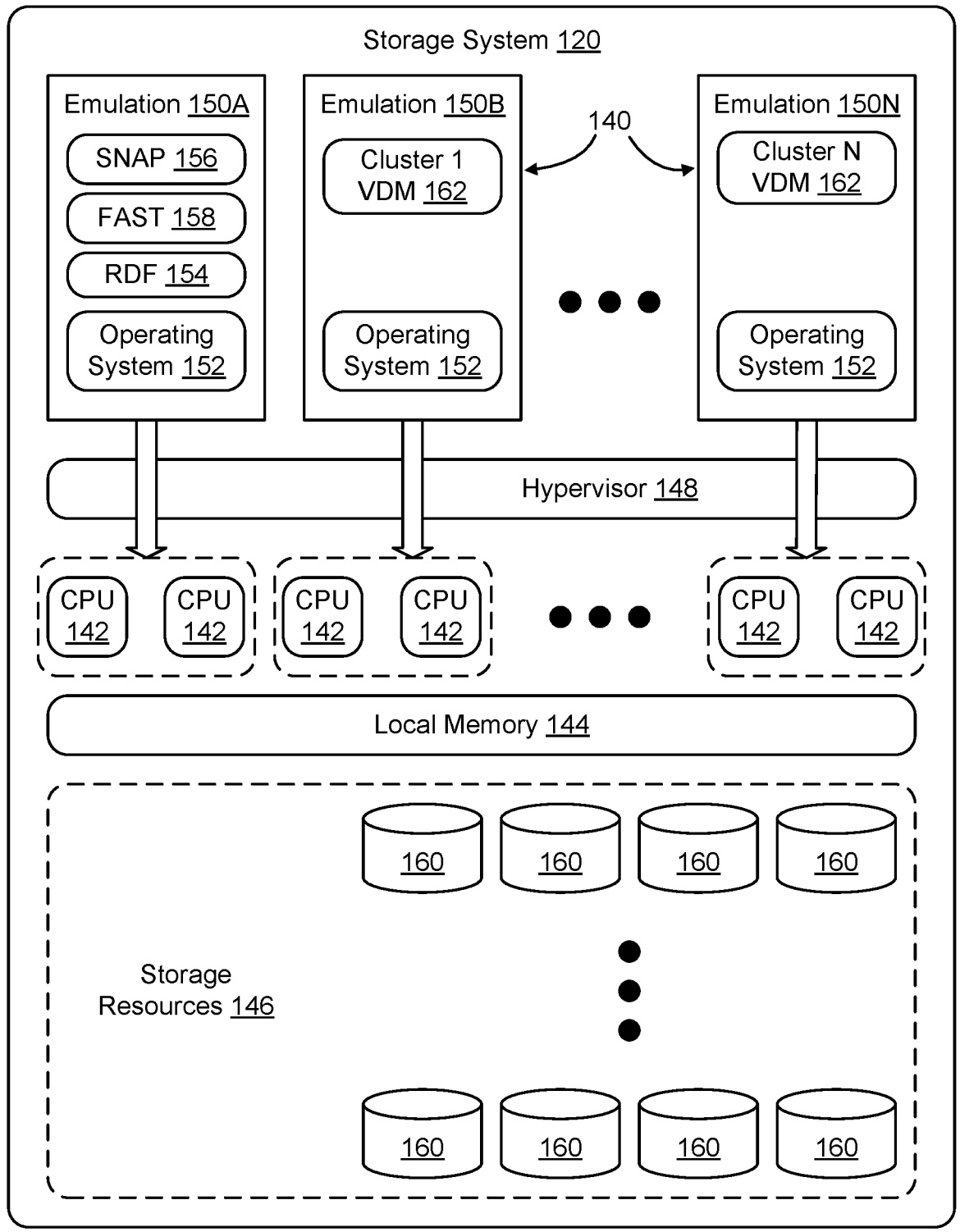
FIG. 2 is a functional block diagram of an example storage system for use in the storage environment of FIG. 1.

FIG. 2 is a functional block diagram of an example storage system 120 for use in the storage environment 100 of FIG. 1. As shown in FIG. 2, the storage system 120 has physical resources including a number of CPU processor cores 142, local memory 144, storage resources 146, and other physical resources. A hypervisor 148 abstracts the physical resources of the storage system 120 from emulations 150, and allocates physical resources of storage system 120 for use by the emulations 150.

Each emulation 150 has an operating system 152 and one or more application processes running in the context of the operating system. As shown in FIG. 2, in some embodiments, one or more of the emulations 150 instantiated on storage system 120 implements one or more Virtual Network Attached Storage (VNAS) software applications to enable the emulation to implement a VNAS server 140 on the communication network 130. As used herein, the term "Virtual Data Mover" (VDM) will be used to refer to one or more software applications configured to execute in an emulation 150 to enable the emulation 150 to implement a VNAS server 140 on the communication network 130. In the example shown in FIG. 2, emulations 150B-150N include VDM applications 162 and, as such, are configured to implement VNAS servers 140 on the communication network 130.

Different virtual data movers may be associated with different data clients 110 and groups of VDMs on separate storage systems 120 are organized in storage clusters. A given storage system 120 may have emulations functioning as nodes in multiple storage clusters. In some embodiments, the VDM applications 162 are implemented in software and abstract the underlying data storage provided by the storage system 120. The VDM applications 162 rely on the applications controlling operation of the underlying storage system 120, such as RDF application 154, SNAP application 156, and FAST application 158 described below, which are used by the storage system 120 to manage the physical storage resources 160 of the storage system 120.

One or more of the emulations 150 may execute applications configured to control how the underlying storage system 120 manages the underlying storage resources 146. For example, one application that may be executing in an emulation 150 on storage system 120 is a snapshot application (SNAP) 156 configured to provide point in time data copying. Multiple SNAP applications 156 may be executing on a given storage system 120 at any point in time. A "snapshot," as that term is used herein, is a copy of data as that data existed at a particular point in time. A snapshot of a file system, accordingly, is a copy of the data of the file system as the data contained in the file system existed at the point in time when the snapshot of the file system was created.

Another example application that may be executing in an emulation 150 is a Remote Data Forwarding (RDF) application 154, which causes subsets of data stored within storage resources 146 to be mirrored by the storage system 120 itself, to one or more similar remote storage systems 120. As noted above, it is possible for the underlying storage systems 120 to perform data replication where the underlying storage systems 120 are compatible and properly configured. The RDF application 154, when executed on storage system 120, enables the storage system 120 to therefore participate in storage system level data replication between sets of mirroring pairs of storage systems. A given storage system, such as storage system 120, may operate as a primary node or secondary node in many mirroring pairs, and hence multiple RDF applications 154 may simultaneously execute on storage system 120 to control participation of the storage system 120 in the mirroring operations. As noted above, in some embodiments the VNAS servers 140 operate to provide data replication directly rather than relying on the underlying storage systems to use a feature such as RDF application 154, to thereby enable data to be replicated between storage systems without consideration of whether the underlying storage systems are compatible and without requiring the underlying storage systems to be configured to participate in RDF mirroring.

In some embodiments, a given storage system 120 may have storage resources 146 that are implemented using an array of discs 160. Storage resources 146 may be implemented using a number of different storage technologies. In some implementations storage resources 146 are configured as tiered storage. A tiered storage system is a storage system that supports storage tiers for which the capital or operational costs per unit of input/output operation processing, or per unit of storage capacity, are different. Differences may be due to the use of different underlying drive technologies of discs 160 or due to different strategies for leveraging storage capacity, such as through compression, or the use of different power management strategies. Many ways of differentiating storage capabilities may be used to identify and define tiers of storage in a tiered storage system.

In some embodiments employing tiered storage, another example application that may be executed in an emulation 150 on storage system 120 is a Fully Automated Storage Tiering (FAST) application 158, configured to move data between tiers of storage resources 146 within the storage system 120. Different groups of storage resources 146 (storage resource pools) may be separately managed by individual FAST applications, and hence a given storage system 120 may have multiple instances of FAST application 158 executing therein at the same time.

Although FIG. 2 has been drawn to show RDF application 154, SNAP application 156, and FAST application 158 operating within the same emulation 150, each application may be executing within its own emulation 150. Likewise, a given storage system 120 may have multiple iterations of each type of application running, to manage different aspects of storage resources 146 of the storage system 120.

Figure 3:
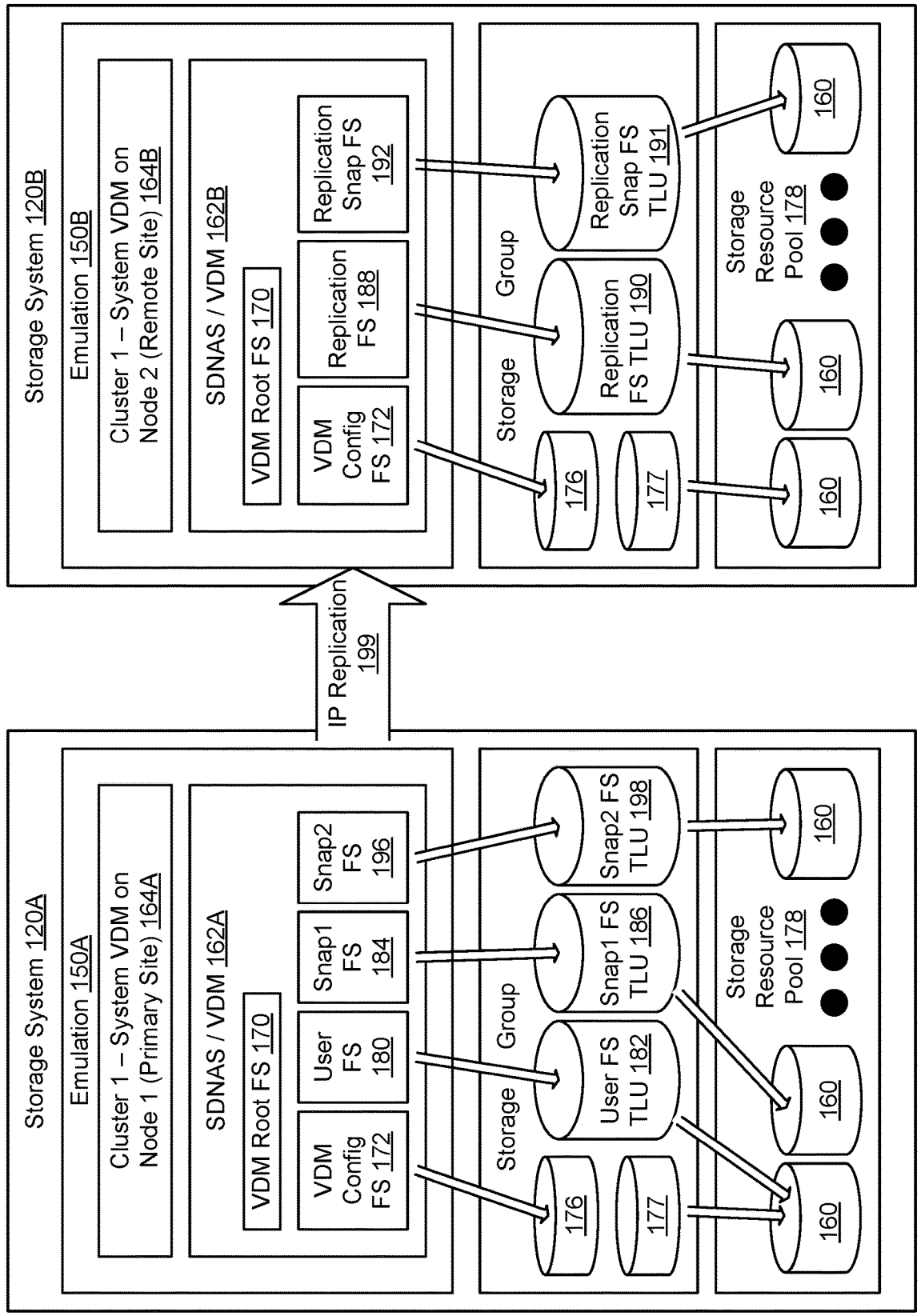
FIG. 3 is a functional block diagram of two storage systems of the storage environment of FIG. 1 in greater detail according to some embodiments of the present disclosure.

FIG. 3 is a functional block diagram of two storage systems of the storage environment of FIG. 1 in greater detail according to some embodiments of the present disclosure. As shown in FIG. 3, a primary SDNAS process, referred to herein as a virtual data mover 162A, is instantiated in emulation 150A on a primary storage system 120A. A backup SDNAS process/VDM 162B, is instantiated in emulation 150B on a backup storage system 120B. In this example, primary VDM 162A and backup VDM 162B are part of a storage cluster (cluster 1). In some embodiments, the primary node of the cluster includes a System VDM 164 controlling the overall structure of the cluster such as which virtual NAS servers 140 are participating in the cluster (membership), which virtual NAS server 140 is the primary VNAS server 140 in the cluster, and which VNAS servers 140 are participating as backups in the cluster. The system VDM may be instantiated in the same emulation 150A on the storage system 120A or in a separate emulation.

In FIG. 3, storage system 120A is hosting the primary VNAS server 140 in the cluster and storage system 120B is hosting the backup VNAS server in the cluster. The storage systems 120A, 120B, as discussed above, have applications 156, 154, 158, executing thereon to control operation of the underlying storage systems 120, but applications 154, 156, 158 are not being used by the underlying storage systems 120 to transfer data to each other at the storage system level. Rather, processes executing within the VDMs 162A, 162B are transferring data within the cluster or across two clusters miles apart over the communication network 130 to enable data replication at the backup VNAS server 140B.

On the primary site, the VDM 162A has a VDM root file system 170, one or more user file systems 180, and a VDM configuration file system 172. The VDM root file system 170 contains data describing the VDM 162A and the VDM configuration file system 172 describes how the data of the VDM root file system 170 and user file systems 180 is stored in underlying storage resources 160 provided by the storage system 120.

The storage system 120 presents storage volumes to the VDM 162 as Thin Logical Units (TLU) 174. A TLU is a logical construct which enables the physical storage resources to be abstracted from the VDM 162. A logical unit is "thin", as that term is used herein, when actual physical resources are only allocated to the TLU as needed. For example, a TLU may be presented to the VDM 162 as having an available size of 1 TeraByte (TB). However, if the file system stored in the TLU is only 0.5 TB in size, the storage system will only allocate 0.5 TB of physical storage resources to the TLU. Thus, the amount of physical storage resources 160 allocated to a TLU will increase and decrease over time as the amount of data stored on the TLU changes over time.

In some embodiments, the VDM root file system 170 is stored in a first TLU referred to herein as a root file system TLU 176, and VDM configuration file system 172 is stored in a second TLU referred to herein as a configuration file system TLU 177. TLUs 176, 177 are stored in physical resources 160 offered by the underlying storage system 120.

Data associated with data client 110 is stored in a user file system 180. Although only a single user file system 180 is shown in FIG. 3 for ease of explanation, the VDM 162A may handle multiple user file systems 180 which may be associated with the same data client 110 or may be associated with different data clients 110. User file system 180 is stored in a separate TLU referred to herein as a user file system TLU 182. Metadata describing the mapping of the user file system TLU 182 to physical storage resources 160 is contained in the VDM configuration file system 172.

The user file system 180 may be backed up by causing the snapshot application SNAP 156 to create point in time copy (snapshot) of the data associated with the user file system 180. The initial user file system snapshot (SNAP1-184) is stored by the storage system 120A in SNAP 1 FS TLU 186. Each time a new user file system snapshot is created, it is stored in its own TLU. According to some embodiments, each time a user file system snapshot is created, the VDM forwards the data associated with the user file system snapshot to the remote site 162B over the communication network 130, to enable a replication user file system 188 to be created on the remote storage system 120B.

Figure 4:
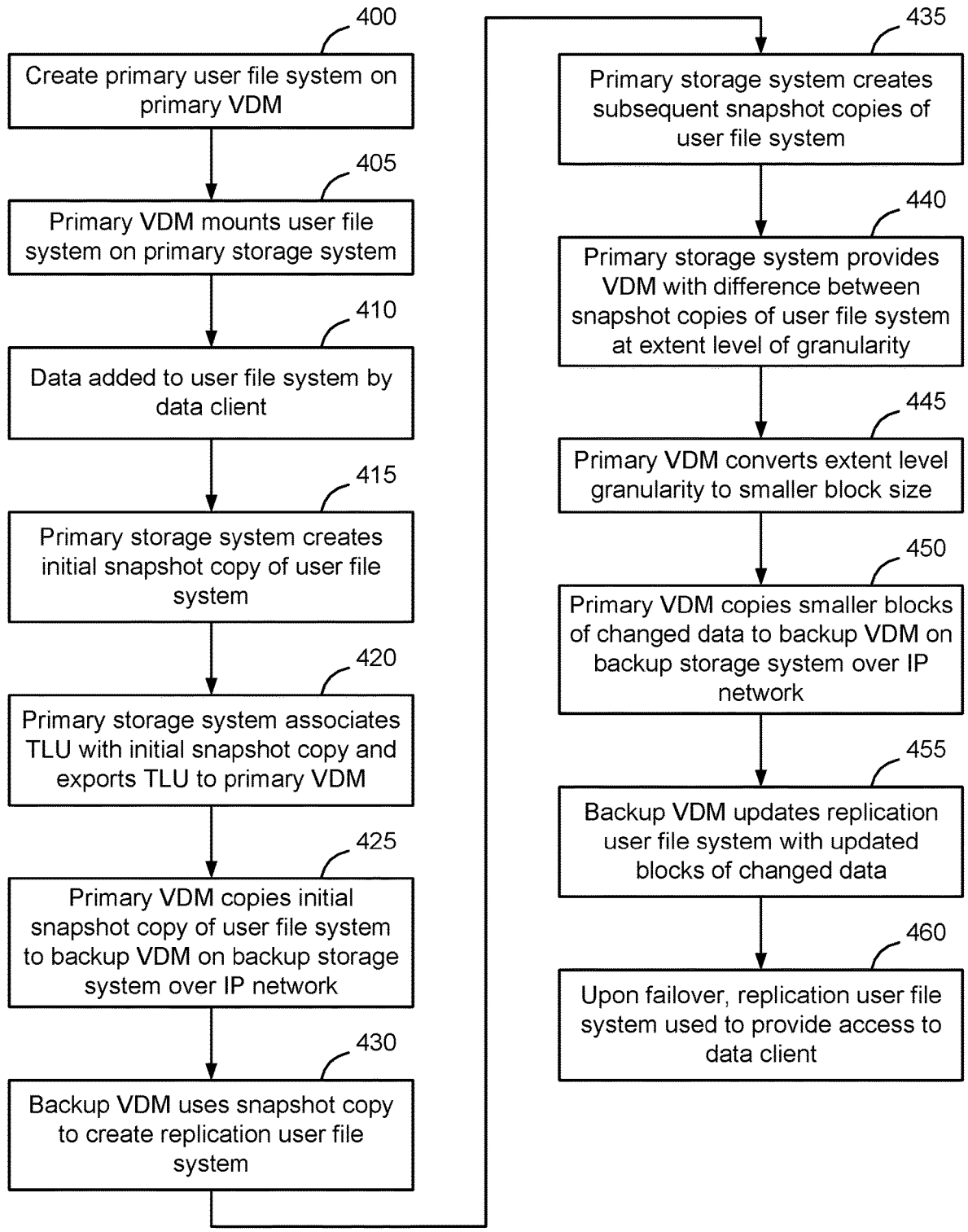
FIG. 4 is a flow chart of a process of file system replication between Software Defined Network Attached Storage (SDNAS) processes using snapshots of the file system provided by an underlying storage system according to some embodiments of the present disclosure.

FIG. 4 is a flow chart of a process of file system replication between Software Defined Network Attached Storage (SDNAS) processes using snapshots of the file system provided by an underlying storage system according to some embodiments of the present disclosure.

As shown in FIG. 4, the primary user file system 180 is created on the primary VDM in block 400. Data associated with the primary user file system 180 is stored by the storage system 120A in a user file system TLU 182. In some embodiments, the primary user file system 180 is kept in a storage group with desired service level objective properties selected by the user. VDM 162A mounts the user file system 180 on the primary storage system 120A at block 405, and the data client 110 adds data to the user file system 180 at block 410. As data is added or deleted, the user file system 180 will be updated. Because the NAS server 162 is connected to the communication network 130, the data client 110 may access the user file system 180 from anywhere on the communication network 130.

At block 415, the primary storage system 120A creates an initial user file system snapshot copy 184 of the user file system 180. In some embodiments, the SNAP application 156 is used to create the initial user file system snapshot copy 184. The initial snapshot copy 184 of the user file system 180 is stored in SNAP 1 TLU 186 by the storage system 120A, and the SNAP 1 TLU 186 is exported to the VDM 162 at block 420.

In some embodiments, the SNAP application 156 running on storage system 120A creates a snapshot copy of the user file system 180 stored in user file system TLU 182 at a particular point in time, and stores the data associated with the snapshot copy of the user file system 180 in a separate TLU referred to in FIG. 3 as SNAP 1 FS TLU 186. Once the snapshot copy file system has been created by the storage system, it is exported to the VDM 162 to become available to the VDM 162 as an initial snapshot copy file system 184.

In some embodiments, in connection with creating the snapshot copy file system, the storage system 120A will try mounting the user file system TLU 182 from the VDM server as a checkpoint file system. The mount triggers a check of pending sub-transactions and transactions on the user file system TLU 182 through the file system layer. The pending sub-transactions and transactions are replayed and the snapshot copy file system (SNAP 1 FS 184) is then clean for mounting. Once the snapshot copy file system 184 is clean for mounting, the mount routine proceeds and the storage system 120A mounts the snapshot copy file system (SNAP 1 FS 184) as a file system. An export routine on the storage system 120A then exports the SNAP 1 file system 184 and makes it available to the VDM 162A with correct authentication.

Once the first snapshot (SNAP 1 184) is created, VDM 162A uses an IP replication session 199 to transmit a full copy of the initial snapshot copy file system 184 to the remote site 162B at block 425. In some embodiments, the VDM 162A also copies the VDM root file system 170 and VDM configuration file system 172 to the remote site using the IP replication session 199.

On the remote site, the backup VDM 162B uses the full copy of the initial snapshot copy file system 184 to create a replication user file system 188, at block 430, which is stored by storage system 120B in replication TLU 190. In some embodiments, the backup storage system 120B uses a snapshot application 156 instantiated thereon to create a snapshot (replication snap file system 192) of the data in the replication TLU 190. The snapshot of the replication TLU is stored by the backup storage system 120B in a separate replication SNAP TLU 191, which is exported to backup VDM 162B as replication snapshot file system 192. The combination of the replication file system 188 and snapshot file system 192 provides a stable file system view of the user file system 180 at the remote VDM 162B.

At a subsequent point in time, either manually or programmatically, a new snapshot copy of the user file system (SNAP 2 196) is created on the primary storage system 120A at block 435. The new snapshot copy of the user file system is stored by the storage system 120A in TLU 198 and exported to primary VDM 162A as snapshot 2 file system 196. Each subsequent snapshot copy is likewise stored in its own TLU. Depending on the embodiment, a given file system may limit the number of snapshot copies that may be stored for a given file system.

The second snapshot copy of the user file system, and each subsequent snapshot copy of the user file system, provides the difference of data between the new snapshot copy of the user file system 180 and any previous snapshot copy of the user file system. In some embodiments, snapshots are created as scheduled by the storage system 120, and are also created intermittently when requested by a customer, e.g. by data client 110. Each time a file system snapshot is created, the accumulated difference shown in the snapshot copy of the user file system relative to an earlier version of the user file system at a time when a previous snapshot was taken is transferred to the remote site 162B using an IP replication session 199 to enable the replication file system 188 to be updated on the remote site 162B.

In some embodiments, storage systems store data on storage resources 160 as blocks of data referred to herein as "extents". For ease of explanation an embodiment will be described in which the storage system divides storage resources into fixed extents having a size of 128 KB, although other sized extents could likewise be used depending on the implementation. In some embodiments, the snapshot application 156 running on the storage system 120A detects differences between the data contained in the user file system 180 during a previous snapshot creation process and the current data of the user file system 180, to determine which extents should be included in the snapshot copy. Only extents with changed data are included in the snapshot copy. If an extent includes changed data, the extent is copied and stored in the snapshot TLU, and if the data in an extent has not changed relative to the earlier snapshot, that extent does not become part of the snapshot copy Depending on the embodiment, and the size of the extent, it may be that a given extent will include some data that has not changed relative to an earlier snapshot copy or perhaps only very little data that has changed relative to the earlier snapshot copy.

In some embodiments, the snapshot application 156 provides the VDM 162A with a bit map identifying the extents that store user file system data that have changed at block 440. The VDM 162A, in some embodiments, takes each extent of data and converts it to 8 KB blocks at the software defined network attached storage/storage system adapter layer at block 445. The block offset of each changed 8 KB block is provided to the VDM 162A, which causes the smaller block of data to be read and compared with corresponding data of the previous snapshot copy. Those smaller blocks of data that include changed data are transferred to the backup VDM 162B using IP replication at block 450. Smaller blocks of data that do not include changed data are not transferred to the backup VDM 162B. By performing a data comparison using a smaller block size and only replicating sub-blocks of extents that include changed data, it is possible to reduce transmission of data on the IP replication session 199 to reduce congestion on the communication network 130 and reduce the amount of time it takes to perform snapshot synchronization from the primary VDM 162A to the remote VDM 162B.

At the remote file system 120B, the backup VDM 162B uses the data from the new snapshot copy of the user file system (SNAP 2 196) to update the replication file system 188, so that the replication file system 188 contains the most recent version of the user file system 180 at block 455. The remote VDM 162B does not separately store the second snapshot copy of the user file system SNAP 2 196 or any subsequently received snapshot copy of the user file system 180 from the primary VDM 162A. Rather, the data contained in the snapshot copies of the user file system is used by the backup VDM 162B to update the replication file system 188 and then is discarded. Optionally, a snapshot application 156 running on the backup storage system 120B may periodically make snapshot copies of the replication file system 188. Whenever a snapshot copy of the replication file system 188 is created it is used to replace the data contained in replication SNAP TLU 191 and the new replication SNAP file system 192 is exported to the backup VDM 162B. The backup storage system 120B may make snapshot copies of the replication file system 188 at whatever frequency is determined to be desirable, and creation of snapshot copies 192 by the backup storage system 120B is not required to be synchronized with receipt of snapshot copies of the user file system from the primary storage system 120A. Thus, depending on the implementation, the backup storage system 120B may make a snapshot copy of the replication file system 188 asynchronously with receipt of updated file system information from the primary VDM 162A.

Importantly, by transferring the file system snapshots containing only changed data using IP replication sessions, it is possible to achieve online file system data replication without relying on the underlying capabilities of the file systems 120A, 120B. This enables different types of file systems to be used to support the primary VDM 162A and remote VDM 162B, because the underlying storage systems 120A, 120B are not required to coordinate directly with each other. Stated differently, different storage systems from the same vendor may have different capabilities which may make it difficult for those storage systems to directly coordinate with each other in connection with mirroring or copying data from a primary site to a backup site. Likewise, different storage systems that originate from different vendors may be incapable of coordinating the backup of data from a primary site to a remote site. By using software defined Network Attached Storage, it is possible to instantiate VDMs in emulations on any underlying storage systems, to enable the primary and backup data to be stored on any storage system regardless of whether the underlying storage systems are able to communicate with each other. Since data transfer occurs via IP replication sessions over a communication network 130, it is possible to implement redundancy by instantiating nodes of a storage cluster on any available storage system without regard for the underlying compatibility of the storage systems. This provides enhanced flexibility and ease of deployment to improve the manner in which data may be stored in a storage environment 100.

As discussed above, the remote site VDM 162B has a replication copy 184 of the user file system 180. The data in the replication copy 188 will be current as of the time of generation of the most recent snapshot copy of the user file system that was received by the remote VDM 162B. Upon failover from the primary VDM 162A to the remote VDM 162B, the replication user file system 188 will be brought online at block 460, and any transactions subsequent to the time of generation of the most recent snapshot copy of the user file system 180 will need to be applied to the replication user file system 188 to bring the replication user file system 188 up to the current state of the user file system 180 in primary VDM 162A.

By using IP replication to exchange data from the primary site to the remote site, it is possible to perform replication of the user file system entirely in software without requiring the primary storage system 120A and backup storage system 120B to be able to do so directly. This enables different types of storage systems to be used as primary storage system 120A and backup storage system 120B because the storage systems do not need to be able to coordinate the exchange of data between each other to enable the virtual network attached storage systems to operate in a given cluster or across clusters. Likewise, although the physical resources used to store the user file system 180 are shown in FIG. 3 as being local to the VDM 162A, the actual location of the physical resources (discs) is not limited to being local to the VDM 162A and may in fact be attached at any location on the communication network 130.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of file system replication between Software Defined Network Attached Storage (SDNAS) processes using snapshots of the file system provided by an underlying storage system, the computer program including a set of instructions which, when executed by a computer, cause the computer to perform a method comprising the steps of:
   creating an initial snapshot copy of a user file system by a first storage system;
   providing the initial snapshot copy of the user file system by the first storage system to the SDNAS process;
   forwarding the initial snapshot copy of the user file system from the first SDNAS process to a second SDNAS process on a second storage system over a communication network;
   creating subsequent snapshot copies of the user file system by the first storage system, each subsequent file system snapshot copy of the user file system showing changes to the user file system between the content of the user file system at a point in time of creation of a preceding file system snapshot copy and the content of the user file system at the time of creation of the subsequent file system snapshot copy;
   providing the subsequent snapshot copies of the user file system by the first storage system to the SDNAS process; and
   forwarding the subsequent snapshot copies of the user file system from the first SDNAS process to the second SDNAS process on the second storage system over the communication network;
   wherein the step of forwarding the subsequent snapshot copies of the user file system comprises receiving extents of data from the storage system containing both changed data and unchanged data and forwarding the changed data from the first SDNAS process to the second SDNAS process.

2. The non-transitory tangible computer readable storage medium of claim 1, the method further comprising using, by the second SDNAS process, the initial snapshot copy to create a replication file system; and using, by the second SDNAS process, the subsequent snapshot copies of the user file system to update the replication file system.

3. The non-transitory tangible computer readable storage medium of claim 2, wherein the second SDNAS process does not store the subsequent snapshot copies of the user file system.

4. The non-transitory tangible computer readable storage medium of claim 3, the method further comprising periodically creating a replication file system snapshot copy of the replication file system by the second storage system.

5. The non-transitory tangible computer readable storage medium of claim 1, wherein the step of forwarding the subsequent snapshot copies of the user file system comprises, parsing the extents of data into sub-blocks, determining which sub-blocks contain the changed data; and only forward sub-blocks containing changed data to the second storage system.

6. The non-transitory tangible computer readable storage medium of claim 1, wherein the communication network is an Internet Protocol (IP) network.

7. The non-transitory tangible computer readable storage medium of claim 6, wherein the step of forwarding the initial snapshot copy of the user file system over the IP communication network is implemented on the IP communication network using a first IP replication session.

8. The non-transitory tangible computer readable storage medium of claim 7, wherein the step of forwarding the subsequent snapshot copies of the user file system over the IP communication network is implemented on the IP communication network using subsequent IP replication sessions.

9. The non-transitory tangible computer readable storage medium of claim 6, further comprising the step of forwarding an initial snapshot copy of a root file system and an initial snapshot copy of a configuration file system to the second SDNAS process on the second storage system over the IP communication network.

10. The non-transitory tangible computer readable storage medium of claim 9, wherein the initial snapshot copy of the root file system and the initial snapshot copy of the configuration file system is transmitted on the IP communication network using the first IP replication session.

11. A storage system, comprising:
    physical resources;
    an operating system controlling allocation of the physical resources of the storage system;
    a hypervisor abstracting the physical resources of the storage system from emulations, each emulation having a second operating system controlling execution of applications within the emulation;
    a first emulation configured to implement a first Software Defined Network Attached Storage (SDNAS) process; and
    a second emulation configured to implement a snapshot software process to create snapshot copies of a user file system stored in the physical resources and provide the snapshot copies of the user file system to the software defined network attached storage process;

wherein the first SDNAS process of the first emulation includes control logic configured to:

forward an initial snapshot copy of the user file system to a second SDNAS process on a second storage system over a communication network;

receive subsequent snapshot copies of the user file system, each subsequent file system snapshot copy of the user file system showing changes to the user file system between the content of the user file system at a point in time of creation of a preceding file system snapshot copy and the content of the user file system at the time of creation of the subsequent file system snapshot copy;

forward the subsequent snapshot copies of the user file system from the first SDNAS process to the second SDNAS process on the second storage system over the communication network;

wherein the step of forwarding the subsequent snapshot copies of the user file system comprises receiving extents of data from the storage system containing both changed data and unchanged data and forwarding the changed data from the first SDNAS process to the second SDNAS process.

12. The storage system of claim 11, wherein the control logic configured to forward the subsequent snapshot copies of the user file system includes control logic configured to parse the extents of data into sub-blocks, determine which sub-blocks contain the changed data; and only forward sub-blocks containing changed data to the second storage system.

13. The storage system of claim 11, wherein the communication network is an Internet Protocol (IP) network.

14. The storage system of claim 13, wherein the initial snapshot copy of the user file system is forwarded over the IP communication network using a first IP replication session.

15. The storage system of claim 14, wherein the subsequent snapshot copies of the user file system are forwarded over the IP communication network using subsequent IP replication sessions.

16. The storage system of claim 13, wherein the first SDNAS process further comprises control logic configured to forward an initial snapshot copy of a root file system and an initial snapshot copy of a configuration file system to the second SDNAS process on the second storage system over the IP communication network.

17. The storage system of claim 16, wherein the initial snapshot copy of the root file system and the initial snapshot copy of the configuration file system are transmitted on the IP communication network using the first IP replication session.

* * * * *